US011746226B2

(12) United States Patent
Shih et al.

(10) Patent No.: US 11,746,226 B2
(45) Date of Patent: Sep. 5, 2023

(54) POLYMER COMPOSITION, FOAM AND METHOD THEREOF

(71) Applicant: TSRC Corporation, Kaohsiung (TW)

(72) Inventors: Hsi-Hsin Shih, Kaohsiung (TW); Chia-Hung Hsu, Kaohsiung (TW); Pang-Hsuan Lin, Kaohsiung (TW); Yun-Shiuan Yeh, Kaohsiung (TW)

(73) Assignee: TSRC CORPORATION, Kaohsiung (TW)

( * ) Notice: Subject to any disclaimer, the term of this patent is extended or adjusted under 35 U.S.C. 154(b) by 456 days.

(21) Appl. No.: 16/704,166

(22) Filed: Dec. 5, 2019

(65) Prior Publication Data
US 2020/0224023 A1    Jul. 16, 2020

Related U.S. Application Data

(60) Provisional application No. 62/775,990, filed on Dec. 6, 2018.

(51) Int. Cl.
*C08L 53/02* (2006.01)
*C08J 9/00* (2006.01)
(Continued)

(52) U.S. Cl.
CPC ............. *C08L 53/025* (2013.01); *C08J 9/122* (2013.01); *C08L 91/00* (2013.01); *C08J 2201/03* (2013.01);
(Continued)

(58) Field of Classification Search
CPC .... C08L 53/025; C08L 91/00; C08L 2203/14; C08L 2205/02; C08L 2207/04;
(Continued)

(56) References Cited

U.S. PATENT DOCUMENTS 3,442,681 A * 5/1969 Newman .................. B41M 5/10
428/315.7
6,451,865 B1    9/2002 Migchels et al.
(Continued)

FOREIGN PATENT DOCUMENTS

CN    101087851 A    12/2007
CN    101255263 A    9/2008
(Continued)

OTHER PUBLICATIONS

Turgut et al., Thermoplastic Elastomer Systems Containing Carbon Nanofibers as Soft Piezoresistive Sensors, ACS Omega 2018, 3, p. 12648-12657. (Year: 2018).*
(Continued)

*Primary Examiner* — K. Boyle
(74) *Attorney, Agent, or Firm* — Hoffman Warnick LLC (57) ABSTRACT

The present invention provides a polymer composition for manufacturing a foam, the polymer composition comprising a vinyl aromatic based copolymer and a processing aid, wherein the amount of the processing aid in the total weight of the polymer composition is equal to or more than 5 wt % and equal to or less than 75 wt %; and the polymer composition does not comprise ethylene-vinyl acetate copolymer, ethylene-butyl acrylate copolymer, ethylene-α-olefin copolymer, homopolymer and copolymer of polyethylene, homopolymer and copolymer of polypropylene, homopolymer and copolymer of polybutene and olefin-based ionic polymer. The present invention also provides the foam and the method for forming the same.

18 Claims, 5 Drawing Sheets

(51) Int. Cl.
    *C08L 91/00*         (2006.01)
    *C08J 9/12*          (2006.01)

(52) U.S. Cl.
    CPC ...... *C08J 2201/032* (2013.01); *C08J 2203/06* (2013.01); *C08J 2203/08* (2013.01); *C08J 2205/044* (2013.01); *C08J 2207/10* (2013.01); *C08J 2353/02* (2013.01)

(58) Field of Classification Search
    CPC ...... C08L 2207/322; C08L 53/00; C08L 9/06; C08L 25/10; C08L 25/18; C08L 67/00; C08L 77/00; C08J 9/122; C08J 2201/03; C08J 2201/032; C08J 2203/06; C08J 2203/08; C08J 2205/044; C08J 2207/10; C08J 2353/02; C08J 9/18; C08J 9/232; C08J 2451/06; C08J 2453/02; C08J 2477/00; C08J 9/0061; C08J 2491/06; C08J 2205/026; B29C 44/35; B29C 48/022; B29C 48/25
    See application file for complete search history.

(56) References Cited

U.S. PATENT DOCUMENTS

| | | | |
|---|---|---|---|
| 9,499,675 | B2 | 11/2016 | Okumura et al. |
| 10,113,045 | B2 | 10/2018 | Tateishi et al. |
| 2005/0124709 | A1 | 6/2005 | Krueger et al. |
| 2006/0068187 | A1 | 3/2006 | Krueger et al. |
| 2008/0161485 | A1 | 7/2008 | Suzuki et al. |
| 2009/0234035 | A1 | 9/2009 | Cheung et al. |
| 2010/0099784 | A1 | 4/2010 | Su et al. |
| 2010/0227967 | A1* | 9/2010 | Page .................. C08L 53/02 524/514 |
| 2011/0143112 | A1* | 6/2011 | Cai .................. B32B 7/022 525/89 |
| 2011/0306691 | A1 | 12/2011 | Sosa et al. |
| 2012/0085038 | A1 | 4/2012 | Jeong et al. |
| 2012/0178873 | A1* | 7/2012 | Reimers .................. C08L 25/14 526/329.2 |
| 2014/0100311 | A1* | 4/2014 | Cai .................. C08L 3/02 524/313 |

FOREIGN PATENT DOCUMENTS

| | | |
|---|---|---|
| CN | 102775944 A | 11/2012 |
| CN | 105778390 A | 7/2016 |
| CN | 107207913 A | 9/2017 |
| CN | 108676310 A | 10/2018 |
| EP | 1352921 B1 | 10/2003 |
| JP | 2003292666 A | 10/2003 |
| JP | 2010070655 A | 4/2010 |
| JP | 2012529553 A | 11/2012 |
| JP | WO2013179455 A1 | 12/2013 |
| JP | 2017088812 A | 5/2017 |
| KR | 20150016261 A | 2/2015 |
| TW | I300423 B | 9/2008 |
| TW | I312001 B | 7/2009 |
| WO | 2006088187 A1 | 8/2006 |
| WO | 2010134554 A1 | 11/2010 |
| WO | 2016099926 A1 | 6/2016 |

OTHER PUBLICATIONS

2007). Olefin. In Hawley's Condensed Chemical Dictionary, R.J. Lewis (Ed.), https://doi.org/10.1002/9780470114735.hawley12024 (Year: 2007).*
European Search Report and Written Opinion for corresponding EP Application No. 19000546.2-1102 dated Apr. 17, 2020, 11 pages.
EP Search Report and Written Opinion for corresponding EP Application No. 19000546.2 dated Sep. 23, 2020, 11 pages.
TW Office Action for corresponding TW Application No. 10920766980 dated Aug. 17, 2020, 4 pages (Taiwanese Only).
Taiwanese Office Action and Search Report for corresponding TW Application No. 108144747, 8 pages.
KR Office Action and English Translation thereof for corresponding Korean Patent Application No. 10-2019-0161057 dated Nov. 9, 2020, 15 pages.

\* cited by examiner

POLYMER COMPOSITION, FOAM AND METHOD THEREOF

BACKGROUND OF THE INVENTION

Field of the Invention

The present invention relates to a polymer composition, particularly to a polymer composition containing vinyl aromatic based copolymer, for manufacturing a foam.

Description of the Prior Art

Producing light-weight soft elastomer has always been the development goal of manufacturers around the world, wherein polymer gel or silicone gel is one of the mainstream materials. The compounds used in the conventional polymer gel includes vinyl aromatic based copolymers, linear polyolefin based elastomers (for example, POE, like Tafmer, ENGAGE, etc.), linear polyolefin based polymers (for example, PE, PP, etc.) or other polymers. The conventional compounds may be added with aromatic oil, naphthenic oil or paraffin oil to produce non-foamed polymer gel having a density of approximate 0.9 $g/cm^3$. Such material has been widely used in sports related accessories, shoe soles, health care materials, daily necessities, etc. However, since the density and physical properties of gel made of the conventional compounds are related to the amount of the filled oil, it's hard to lower the specific gravity of such gel, as being limited by the property of oil self. These results in the inability to combine the softness/hardness and the specific gravity, especially in certain specific purposes the light-weight properties of the obtained gel are insufficient.

Foamed polymer gels made of vinyl aromatic based copolymers is well known, as described in TW I300423, CN 101087851, CN 100558799 and U.S. Pat. No. 7,291,382. However, most of these foamed polymer gels comprise linear polyolefin based polymers, which have the disadvantage of being difficult to reduce the hardness. U.S. Pat. No. 6,451,865 also discloses a foamed thermoplastic elastomers made of vinyl aromatic based copolymer, in which plastic particles encapsulating heat expandable gas or liquefied gas are used. This method is prone to remain foaming-uncompleted particles in the elastomers, which makes it difficult to control the degree of foaming.

SUMMARY OF THE INVENTION

To solve the above problems, the present invention provides a polymer composition for forming a foam and the related manufacturing methods thereof.

The present invention provides a polymer composition by adding specific proportion of processing aid into vinyl aromatic based copolymer and then physically foaming it to obtain a foam having a density less than or equal to 0.6 $g/cm^3$.

In one aspect, the invention provides a foam made by merely foaming the above polymer composition in supercritical fluid, wherein the polymer composition can form fine and uniform cells. At the same density, finer cell sizes and higher cell densities result in better physical properties such as rebound value. In the present invention, the cell type of the foam made from the polymer compositions may vary with the amount of oil added. When the oil content is high (>40 weight %), the cross-section of the foam under SEM observation shows an expanded gel with many cells clustered together that look like microbeads (micro foam beads). Such foam has a high resilience and comfortable touch. When the oil content is less (<30 weight %), it forms a closed cell structure, which results in a much lighter foam. When the oil content is between 30 to 40 weight %, it forms a structure where such cells (micro foam beads) and closed cells are present.

In one embodiment, the present invention provides a polymer composition for manufacturing a foam, the polymer composition comprising a vinyl aromatic based copolymer and a processing aid, wherein the amount of the processing aid in the total weight of the polymer composition is equal to or more than 5 wt % and less than or equal to 75 wt %; and the polymer composition docs not comprise ethylene-vinyl acetate copolymer, ethylene-butyl acrylate copolymer, ethylene-α-olefin copolymer, homopolymer and copolymer of polyethylene, homopolymer and copolymer of polypropylene, homopolymer and copolymer of polybutene and olefin-based ionic polymer.

In another one embodiment, the present invention provides the polymer composition as aforementioned, wherein the polymer composition does not comprise any olefin-based polymer.

In another one embodiment, the present invention provides the polymer composition as aforementioned, wherein the polymer composition only comprises the vinyl aromatic based copolymer and the processing aid.

In another one embodiment, the present invention provides the polymer composition as aforementioned, wherein the polymer composition only comprises the vinyl aromatic based copolymer and a process oil.

In another one embodiment, the present invention provides die polymer composition as aforementioned, wherein the polymer composition is used for foaming with supercritical fluid.

In another one embodiment, the present invention provides the polymer composition as aforementioned, wherein the amount of the processing aid in the total weight of the polymer composition is equal to or more than 5 wt % and less than 30 wt %, and the processing aid comprises a process oil.

In another one embodiment, the present invention provides the polymer composition as aforementioned, wherein the amount of the processing aid in the total weight of the polymer composition is equal to or more than 30 wt % and equal to or less than 40 wt %, and the processing aid comprises a process oil.

In another one embodiment, the present invention provides the polymer composition as aforementioned, wherein the amount of the processing aid in the total weight of the polymer composition is more than 40 wt % and equal to or less than 75 wt %, and the processing aid comprises a process oil.

In another one embodiment, the present invention provides the polymer composition as aforementioned, wherein the vinyl aromatic based copolymer is selected from non-hydrogenated polymer, hydrogenated polymer or the combinations thereof, wherein the hydrogenated polymer can be partially hydrogenated or fully hydrogenated.

In another one embodiment, the present invention provides the polymer composition as aforementioned, wherein the vinyl aromatic based copolymer is hydrogenated polymer.

In another one embodiment, the present invention provides the polymer composition as aforementioned, wherein the vinyl aromatic based copolymer includes linear copolymer, radial copolymer, branched copolymer, or asymmetry copolymer.

In another on embodiment, the present invention provides the polymer composition as aforementioned, wherein the vinyl aromatic based copolymer is linear copolymer.

In another one embodiment, the present invention provides the polymer composition as aforementioned, wherein the vinyl aromatic monomer content of the vinyl aromatic based copolymer is preferred 10 wt % to 80 wt %, more preferred 10 wt % to 35 wt %, even more preferred 20 wt % to 35% wt %.

In another one embodiment, the present invention provides the polymer composition as aforementioned, wherein the vinyl structure content of the conjugated diene monomer in the vinyl aromatic based copolymer is preferred 10 wt % to 80 wt %, more preferred 30 wt % to 45 wt %.

In another one embodiment, the present invention provides the polymer composition as aforementioned, wherein the vinyl aromatic based copolymer is SEBS(Styrene-Ethylene-Butylene-Styrene), SBS(Styrene-Butadiene-Styrene), SIS(Styrene-Isoprene-Styrene), SEPS(Styrene-Ethylene-Propylene-Styrene), SEEPS(Styrene-Ethylene-Ethylene-Propylene-Styrene), SIBS(Styrene-Isoprene/Butadiene-Styrene), SSBR(Solution Styrene-Butadiene Rubber), SB(Styrene-Butadiene), SI(Styrene-Isoprene), SEB(Styrene-Ethylene-Butylene), SEP(Styrene-Ethylene-Propylene) or any combination thereof.

In another one embodiment, the present invention provides the polymer composition as aforementioned, wherein the weight average molecular weight of the vinyl aromatic based copolymer is 50,000~550,000, 100,000~550,000, 100,000~500,000, 100,000~260,000, 200,000~260,000, 150,000~550,000, 150,000~500,000, or 200,000~500,000.

In another one embodiment, the present invention provides the polymer composition as aforementioned, wherein the vinyl aromatic based copolymer is a hydrogenated copolymer, the weight average molecular weight of the vinyl aromatic based copolymer ranges from 50,000 to 550,000, the vinyl aromatic monomer content of the vinyl aromatic based copolymer is 20 wt % to 35 wt %, the vinyl structure content of the conjugated diene monomer in the vinyl aromatic based copolymer is 30 wt % to 45 wt %.

In another one embodiment, the present invention provides the polymer composition as aforementioned, wherein the vinyl aromatic based copolymer is a hydrogenated copolymer, the weight average molecular weight of the vinyl aromatic based copolymer ranges from 200,000 to 500,000, the vinyl aromatic monomer content of the vinyl aromatic based copolymer is 20 wt % to 35 wt %, the vinyl structure content of the conjugated diene monomer in the vinyl aromatic based copolymer is 30 wt % to 45 wt %.

In another one embodiment, the present invention provides die polymer composition as aforementioned, wherein the vinyl aromatic based copolymer is a hydrogenated copolymer, the weight average molecular weight of the vinyl aromatic based copolymer ranges from 200,000 to 500,000, the vinyl aromatic monomer content of the vinyl aromatic based copolymer is 20 wt % to 35 wt %, the vinyl structure content of the conjugated diene monomer in the vinyl aromatic based copolymer is 30 wt % to 45 wt %.

In another one embodiment, the present invention provides the polymer composition as aforementioned, wherein the vinyl aromatic based copolymer is a hydrogenated copolymer, the weight average molecular weight of the vinyl aromatic based copolymer ranges from 100,000 to 500,000, preferred 100,000~260,000, the vinyl aromatic monomer content of the vinyl aromatic based copolymer is 20 wt % to 35 wt %, the vinyl structure content of the conjugated diene monomer in the vinyl aromatic based copolymer is 30 wt % to 45 wt %.

In another one embodiment, the present invention provides the polymer composition as aforementioned, wherein the vinyl aromatic based copolymer is styrene-ethylene-butylene-styrene block copolymer.

In another one embodiment, the present invention provides the polymer composition as aforementioned, further comprising a crystalline polymer.

In another one embodiment, the present invention provides the polymer composition as aforementioned, further comprising a compatibilizer.

In another one embodiment, the present invention provides the polymer composition as aforementioned, wherein the crystalline polymer is selected from polyamide, thermoplastic polyamide elastomer, thermoplastic polyester elastomer (TPEE), thermoplastic polyurethane elastomer (TPU), polyester, polyethylene terephthalate (PET), polybutylene terephthalate (PBT), polytrimethylene terephthalate (PTT) or polyoxymethylene (POM).

In another one embodiment, the present invention provides the polymer composition as aforementioned, wherein the compatibilizer is maleic anhydride grafted styrene-ethylene-butylene-styrene block copolymer (MA-SEBS).

In another one embodiment, the present invention provides the polymer composition as aforementioned, wherein the vinyl aromatic based copolymer is a hydrogenated copolymer, the weight average molecular weight of the vinyl aromatic based copolymer ranges from 200,000 to 500,000, die vinyl aromatic monomer content of the vinyl aromatic based copolymer is 20 wt % to 35 wt %, the vinyl structure content of the conjugated diene monomer in the vinyl aromatic based copolymer is 30 wt % to 45 wt %, the amount of the processing aid in the total weight of the polymer composition is equal to or more than 25 wt % and less than 60 wt %, the processing aid comprises a process oil; and the content of the crystalline polymer in the total weight of the polymer composition is equal to or more than 1 wt % and less than 40 wt %.

In another one embodiment, the present invention provides the polymer composition as aforementioned, further comprising a compatibilizer and the content of the compatibilizer in the total weight of the polymer composition is equal to or less than 25 wt %.

In another one embodiment, the present invention provides the polymer composition as aforementioned, wherein the crystalline polymer is polyamide and the content of the polyamide in the total weight of the polymer composition is equal to or more than 10 wt % and less than 40 wt %.

In another one embodiment, the present invention provides the polymer composition as aforementioned, further comprising a compatibilizer and the compatibilizer is maleic anhydride grafted styrene-ethylene-butylene-styrene block copolymer and the content of the maleic anhydride grafted styrene-ethylene-butylene-styrene block copolymer in the total weight of the polymer composition is equal to or more than 5 wt % and less than 25 wt %.

In another one embodiment, the present invention provides the polymer composition as aforementioned, wherein the crystalline polymer is thermoplastic polyester elastomer and the content of the thermoplastic polyester elastomer in the total weight of the polymer composition is equal to or more than 1 wt % and less than 10 wt %.

In another one embodiment, the present invention provides the polymer composition as aforementioned, further comprising a compatibilizer and the compatibilizer is maleic anhydride grafted styrene-ethylene-butylene-styrene block copolymer and the content of the maleic anhydride grafted styrene-ethylene-butylene-styrene block copolymer in the total weight of the polymer composition is equal to or more than 5 wt % and less than 15 wt %.

In another one embodiment, the present invention provides the polymer composition as aforementioned, wherein the processing aid is selected from process oil, tackifier, plasticizer, melt strength enhancer, or any combination thereof.

In another one embodiment, the present invention provides the polymer composition as aforementioned, wherein the process oil is aromatic oil, naphthenic oil or paraffin oil.

In another one embodiment, the present invention provides the polymer composition as aforementioned, wherein die tackifier is a rosin resin, a petroleum based resin, a terpene resin or an oligomer, wherein the oligomer is polymerized from a plurality of identical or different structural units, and the weight average molecular weight of the oligomer is less than 10,000.

In another one embodiment, the present invention provides the polymer composition as aforementioned, wherein the oligomer is polymerized from monomers of ethylene, butene, styrene or combinations of the above.

In another one embodiment, the present invention provides the polymer composition as aforementioned, wherein the plasticizer is a fatly oil based plasticizer or an epoxidized oil plasticizer.

In another one embodiment, the present invention provides the polymer composition as aforementioned, wherein the fatty oil based plasticizer is glycerin, castor oil, soybean oil or zinc stearate.

In another one embodiment, the present invention provides the polymer composition as aforementioned, wherein the epoxidized oil plasticizer is epoxidized soybean oil or epoxidized linseed oil.

In another one embodiment, the present invention provides the polymer composition as aforementioned, wherein the melt strength enhancer is a fluoride compound.

In another one embodiment, the present invention provides the polymer composition as aforementioned, wherein the melt strength enhancer is polytetrafluoroethylene (PTFE).

In another one embodiment, the present invention provides die polymer composition as aforementioned, wherein the polymer composition further comprising a crosslinking agent.

In another one embodiment, the present invention provides the polymer composition as aforementioned, wherein the polymer composition further comprising a chemical foaming agent.

The present invention provides a foam made from any polymer composition as aforementioned.

In another one aspect, the present invention provides a method for manufacturing a foam, comprising forming a non-foam using die polymer composition as aforementioned, and forming the foam by physically foaming the non-foam.

In one embodiment, the present invention provides die method as aforementioned, wherein the physically foaming is done by impregnating the non-foam in a supercritical fluid for 1 to 120 minutes and then preforming a pressure-releasing operation.

In another one embodiment, the present invention provides the method as aforementioned, wherein the non-foam is a granule obtained by kneading and extruding or injecting the polymer composition as aforementioned.

In another one embodiment, the present invention provides the method as aforementioned, further comprising forming the non-foam by a batch way using a twin-screw extruder, and forming the foam by sending the non-foam to a supercritical fluid impregnation machine.

In another one embodiment, the present invention provides the method as aforementioned, wherein the non-foam is a molded non-foam made by extruding or injecting a plurality of granules through a mold, wherein the granules are obtained by kneading and extruding or injecting the polymer composition as aforementioned.

In another one embodiment, the present invention provides the method as aforementioned, further comprising filling the above-mentioned polymer composition into a extrusion foaming machine and directly forming the foam by kneading, molding and foaming the polymer composition using a continuous way in the extrusion foaming machine, wherein supercritical fluid is injected into the extrusion foaming machine.

In another one aspect, the present invention provides a foam made from vinyl aromatic based copolymer, the foam comprising a plurality of cells, wherein by SEM (scanning electron microscope) observation the foam is characteristic in that:
  the cell size distribution is ranged from 40 μm to 135 μm;
  the aspect ratio of the cell is ranged from 1 to 2.5;
  the number of the cells in 100 μm×100 μm cross section of the foam is one to ten; and
the density of the foam is equal to or less than 0.2 g/cm$^3$.

In one embodiment, the present invention provides the foam as aforementioned, wherein the falling ball rebound value of the foam is equal to or more than 35% and less than 40%.

In another one embodiment, the present invention provides the foam as aforementioned, where the foam is made from a polymer composition, the polymer composition comprising a vinyl aromatic based copolymer and a processing aid, wherein the amount of the processing aid in the total weight of the polymer composition is equal to or more than 5 wt % and less than 30 wt %, and the processing aid comprising a process oil; and the polymer composition does not comprise ethylene-vinyl acetate copolymer, ethylene-butyl acrylate copolymer, ethylene-α-olefin copolymer, homopolymer and copolymer of polyethylene, homopolymer and copolymer of polypropylene, homopolymer and copolymer of polybutene and olefin-based ionic polymer.

In another one embodiment, the present invention provides the foam as aforementioned, wherein the foam is obtained by impregnating a non-foam in a supercritical fluid for 1 to 120 minutes and then performing a pressure-releasing operation and the non-foam is made from the polymer composition as aforementioned.

In another one aspect, the present invention provides a foam made from vinyl aromatic based copolymer, the foam comprising a plurality of cells, wherein by SEM (scanning electron microscope) observation the foam is characteristic in that:
  the cell size distribution is ranged from 10 μm to 30 μm;
  the aspect ratio of the cell is ranged from 1 to 1.5;
  the number of the cells in 100 μm×100 μm cross section of the foam is twenty to thirty; and
the density of the foam is from 0.2 to 0.45 g/cm$^3$.

In one embodiment, the present invention provides the foam as aforementioned, wherein the falling ball rebound value of the foam is equal to or more than 40% and less than 50%.

In another one embodiment, the present invention provides the foam as aforementioned, where the foam is made from a polymer composition, the polymer composition comprising a vinyl aromatic based copolymer and a processing aid, wherein the amount of the processing aid in the total weight of the polymer composition is equal to or more than 30 wt % and equal to or less than 40 wt %, and the processing aid comprising a process oil; and the polymer composition does not comprise ethylene-vinyl acetate copolymer, ethylene-butyl acrylate copolymer, ethylene-α-olefin copolymer, homopolymer and copolymer of polyethylene, homopolymer and copolymer of polypropylene, homopolymer and copolymer of polybutene and olefin-based ionic polymer.

In another one aspect, the present invention provides a foam made from vinyl aromatic based copolymer, the foam comprising a plurality of cells, wherein by SEM (scanning electron microscope) observation the foam is characteristic in that:

the cell size distribution is ranged from 10 μm to 50 μm;
the aspect ratio of the cell is ranged from 1 to 1.5;
the number of the cells in 100 μm×100 μm cross section of the foam is five to thirty; and
the density of the foam is from 0.3 to 0.6 g/cm$^3$.

In one embodiment, the present invention provides the foam as aforementioned, wherein the falling ball rebound value of the foam is equal to or more than 40%.

In one embodiment, the present invention provides the foam as aforementioned, where the foam is made from a polymer composition, the polymer composition comprising a vinyl aromatic based copolymer and a processing aid, wherein the amount of the processing aid in the total weight of the polymer composition is more than 40 wt % and equal to or less than 75 wt %, and the processing aid comprising a process oil; and the polymer composition does not comprise ethylene-vinyl acetate copolymer, ethylene-butyl acrylate copolymer, ethylene-α-olefin copolymer, homopolymer and copolymer of polyethylene, homopolymer and copolymer of polypropylene, homopolymer and copolymer of polybutene and olefin-based ionic polymer.

In another one aspect, the present invention provides a foam made from vinyl aromatic based copolymer, the foam comprising a plurality of cells, wherein the density of the foam is from 0.3 to 0.6 g/cm$^3$ and the falling ball rebound value of the foam is equal to or more than 40%.

In one embodiment, the present invention provides the foam as aforementioned, where the foam is made from a polymer composition, the polymer composition comprising a vinyl aromatic based copolymer and a processing aid, wherein the amount of the processing aid in the total weight of the polymer composition is equal to or more than 25 wt % and less than 60 wt %, and the processing aid comprising a process oil; and the polymer composition does not comprise ethylene-vinyl acetate copolymer, ethylene-butyl acrylate copolymer, ethylene-α-olefin copolymer, homopolymer and copolymer of polyethylene, homopolymer and copolymer of polypropylene, homopolymer and copolymer of polybutene and olefin-based ionic polymer.

In further another one aspect, the present invention provides a part made of the foam as aforementioned.

In one embodiment, the present invention provides the part as aforementioned, wherein the part is formed by bonding the foams. The method of bonding may be by way of microwave or steam.

In another one embodiment, the present invention provides the part as aforementioned, wherein the part can be used in sports article related accessories, shoe materials, healthcare materials, automotive or motorcycle components, or daily necessities.

Other aspects and various embodiments included in the present invention to solve other problems and combined with the above aspects are disclosed in the following detailed descriptions.

DETAILED DESCRIPTION OF THE EMBODIMENTS

The preferred embodiments of the present invention are exemplified below in order to have the invention and the scope of the claims be fully understood. To avoid obscuring the content of the present invention, the following description may omit conventional components, related materials, and related processing techniques.

Measurement Methods for the Present Invention

Weight average molecular weight of vinyl aromatic based copolymer: measured with Gel Permeation Chromatography (GPC), which is a well-known measuring method by skilled in the art.

Conjugated diene monomer content of the vinyl aromatic based copolymer (e.g. butadiene content wt %), vinyl aromatic monomer content of the vinyl aromatic based copolymer (e.g. styrene content wt %) and vinyl structure content of the conjugated diene monomer in the vinyl aromatic based copolymer (e.g. Vinyl %, Vinyl in Bond Diene): measured with a nuclear magnetic resonance spectroscopy, which is a well-known measuring method by skilled in the art. If a hydrogenated polymer is used, the vinyl structure content is calculated on the basis of the polymer before hydrogenation.

Density: measured with specific gravity meter.
Cell size distribution: calculated with a ruler by viewing a SEM photograph of a cross section of a foam.
Aspect ratio of cell: calculated with a ruler by viewing a SEM photograph of a cross section of a foam.
Number of cells per unit area: calculated number of cells per unit area of 100 μm×100 μm by viewing a SEM photograph of a cross section of a foam.
Falling ball rebound value: measured based on ASTM D2632 standard.

Polymer Composition for Manufacturing a Foam

The polymer composition for manufacturing a foam of the present invention comprises a vinyl aromatic based copolymer and a processing aid, wherein the amount of the processing aid in the total weight of the polymer composition is equal to or more than 5 wt % and equal to or less than 75 wt %; and the polymer composition does not comprise ethylene-vinyl acetate copolymer, ethylene-butyl acrylate copolymer, ethylene-α-olefin copolymer, homopolymer and copolymer of polyethylene, homopolymer and copolymer of polypropylene, homopolymer and copolymer of polybutene and olefin-based ionic polymer (e.g. ethylene-based ion polymer). In a preferred embodiment, the polymer composition does not comprise any olefin-based polymer. In addition to the above, the present invention does not limit the addition of other suitable polymers.

The monomers of vinyl aromatic based copolymer are vinyl aromatic monomers and conjugated diene monomers. The conjugated diene monomer suitable for use in the present invention may be a conjugated diene having 4 to 12 carbon atoms, and specific examples thereof include 1,3-butadiene, 1,3-pentadiene, 1,3-hexadiene, 1,3-heptadiene, 2-methyl-1,3-butadiene (isoprene), 2-methyl-1,3-pentadiene, 2-hexyl-1,3-butadiene, 2-phenyl-1,3-butadiene, 2-phenyl-1,3-pentadiene, 2-p-tolyl-1,3-butadiene, 2-benzyl-1,3-butadiene, 3-methyl-1,3-pentadiene, 3-methyl-1,3-hexadiene, 3-butyl-1,3-octadiene, 3-phenyl-1,3-pentadiene, 4-methyl-1,3-pentadiene, 1,4-diphenyl-1,3-butadiene, 2,3-dimethyl-1,3-butadiene, 2,3-dimethyl-1,3-pentadiene, 2,3-dibenzyl-1,3-butadiene, 4,5-diethyl-1,3-octadiene, myrcene, and any combination thereof, among which 1,3-butadiene, or 2-methyl-1,3-butadiene (isoprene) is the preferred choice. Specific examples of the vinyl aromatic monomer suitable for use in the present invention include styrene, methylstyrene and all isomers thereof, ethylstyrene and all isomers thereof, tert-butyl styrene and all isomers thereof, dimethylstyrene and all isomers thereof, methoxystyrene and all isomers thereof, cyclohexylstyrene and all isomers thereof, vinylbiphenyl, 1-vinyl-5-hexylnaphthalene, vinylnaphthalene, vinylanthracene, 2,4-diisopropylstyrene, 5-tert-butyl-2-methylstyrene, divinylbenzene, trivinylbenzene, divinylnaphthalene, tert-butoxystyrene, 4-propyl styrene, 4-dodecylstyrene, 2-ethyl-4-benzyl styrene, 4-(phenylbutyl) styrene, N-(4-vinylbenzyl)-N,N-dimethylamine, 4-vinylbenzyl 2-(dimethylamino)ethyl ether, N,N-dimethylaminomethylstyrene, N,N-dimethylaminoethylstyrene, N,N-diethylaminomethylstyrene, N,N-diethylaminoethylstyrene, vinylxylene, vinylpyridine, diphenylethylene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, indene, diphenylethylene containing tertiary amino groups, such as 1-(4-N,N-dimethylaminophenyl)-1-phenylethylene, and any combinations thereof. Among those described above, styrene or methylstyrene is the preferred choice. Vinyl aromatic based copolymer may be a block, a random, or a taper arrangement of the two monomers mentioned above or other suitable polymeric monomers. Among them, the block copolymer is preferable, and the triblock copolymer is more preferable. Vinyl aromatic based copolymer may select from non-hydrogenated polymer, hydrogenated polymer or the combinations thereof, wherein the hydrogenated polymer can be partially hydrogenated (i.e. the hydrogenation rate of the unsaturated double bonds of the conjugated diene monomers is 10 to 90%) or fully hydrogenated (i.e. the hydrogenation rate of the unsaturated double bonds of the conjugated diene monomers is more than 90%). Preferably, vinyl aromatic based copolymer is hydrogenated polymer. Vinyl aromatic based copolymer also includes linear copolymer, radial copolymer, branched copolymer, or asymmetry copolymer. Preferably, vinyl aromatic based copolymer is linear copolymer. The preferred examples of the vinyl aromatic based copolymers are styrene-ethylene-butylene-styrene (SEBS), Styrene-Butadiene-Styrene(SBS), Styrene-Isoprene-Styrene (SIS), Styrene-Ethylene-Propylene-Styrene (SEPS), Styrene-Ethylene-Ethylene-Propylene-Styrene (SEEPS), Styrene-Isoprene/Butadiene-Styrene (SIBS), Solution Styrene-Butadiene Rubber(SSBR), Styrene-Butadiene (SB), Styrene-Isoprene (SI), Styrene-Ethylene-Butylene (SEB), Styrene-Ethylene-Propylene(SEP) or any combinations thereof. The more preferred example of the vinyl aromatic based copolymers is Styrene-Ethylene-Butylene-Styrene. Among the polymer compositions of the present invention, the vinyl aromatic monomer content of the vinyl aromatic based copolymer is preferred 10 wt % to 80 wt %, more preferred 10 wt % to 35 wt %, even more preferred 20 wt % to 35% wt %. Among the polymer compositions of the present invention, the vinyl structure content of the conjugated diene monomer in the vinyl aromatic based copolymer is preferred 10 wt % to 80 wt %, more preferred 30 wt % to 45 wt %. The weight average molecular weight of the vinyl aromatic based copolymer is preferred 50,000~550,000, 100,000~550,000, 100,000~500,000, 100,000~260,000, 200,000~260,000, 150,000~550,000, 150,000~500,000, or 200,000~500,000.

The processing aid of the present invention is selected from process oil, tackifier, plasticizer, or melt strength enhancer, among which the process oil is the preferred choice. The process oil may be aromatic oil, naphthenic oil or paraffin oil. The tackifier may be a rosin resin, a petroleum based resin, a terpene resin or an oligomer, wherein the oligomer is polymerized from a plurality of identical or different structural units. The weight average molecular weight of the oligomer is less than 10,000. Preferably, the oligomer is polymerized from monomers of ethylene, butene, styrene or combinations of the above. The plasticizer is an additive that increases the softness of a material or liquefies a material. The plasticizer is a fatty oil based plasticizer or an epoxidized oil plasticizer. The fatty oil based plasticizer is glycerin, castor oil, soybean oil or zinc stearate. The epoxidized oil plasticizer is epoxidized soybean oil or epoxidized linseed oil. A melt strength enhancer is an additive that increases the melt strength of a material. The melt strength enhancer is a fluoride compound, and polytetrafluoroethylene (PTFE) is preferred.

In another aspect, the polymer composition of the present invention may further comprise a crystalline polymer, preferably selected from the group consisting of: polyamide, thermoplastic polyamide elastomer, thermoplastic polyester elastomer (TPEE), thermoplastic polyurethane elastomer (TPU), polyester, polyethylene terephthalate (PET), polybutylene terephthalate (PBT), polytrimethylene terephthalate (PTT), polyoxymethylene (POM), etc. The polymer composition containing the crystalline polymer may optionally be added with a compatibilizer, for example, maleic anhydride grafted polymer, like maleic anhydride grafted styrene-ethylene-butylene-styrene block copolymer (MA-SEBS).

In addition to the above components, the polymer composition of the present invention may optionally comprise a crosslinking agent or a chemical foaming agent. The crosslinking agent can be any with cross-linking function like radical generators such as organic peroxides, or azo compounds, etc., nitroso compounds, polyamine compounds, sulfur, sulfur-containing compounds, phenolic resins such as alkylphenol resin, or bromoalkylphenol resin, etc., oxime compounds, combination of p-quinone dioxime and lead dioxide, combination of p,p'-dibenzoylquinone dioxime and trilead tetroxide. The sulfur-containing compounds include sulfur monochloride, sulfur dichloride, disulfide compounds, and high molecular polysulfide compounds. Specific examples of the organic peroxide include dicumyl peroxide, di-tert-butyl peroxide, 2,5-dimethyl-2,5-di(tert-butylperoxy)hexane, 2,5-di(tert-butylperoxy)-2,5-dimethyl-3-hexyne, di(tert-butylperoxyisopropyl)benzene, 1,1-di-(tert-butylperoxy)-3,3,5-trimethylcyclohexane, butyl 4,4-bis (tert-butyldioxy)valerate, benzoyl peroxide, p-chlorobenzoyl peroxide bis(p-ehlorobenzoyl)peroxide, 2,4-dichlorobenzoyl peroxide, tert-butyl peroxybenzoate, tert-butylperoxy isopropyl carbonate, diacetyl peroxide, lauroyl peroxide, tert-butyl cumyl peroxide, tert-butylperoxy 2-ethylhexyl carbonate. These crosslinking agents can be used either individually or as a mixture of two or more thereof. The chemical foaming agent is not particularly limited, and a known and suitable organic foaming agent or inorganic foaming agent can be used. The organic foaming agent may include azo compound, nitroso compound, sulfonyl hydrazide compound, etc. Specific examples of the azo compound include azodicarbonamide (ADCA), azobisisobutyronitrile (AIBN), diisopropyl azodiformate (DIPA), barium azodicarboxylate (BaAC), diethyl azodicarboxylate (Azoform E), diazoamino benzene, barium azodicarboxylate, etc.; specific examples of the nitroso compound include N,N'-dinitrosopentamethylenetetramine (DPT), N,N'-dinitroso-N,N'-dimethyl terephthalamide (NTA), etc.; specific examples of the sulfonyl hydrazide compound include benzenesulfonyl hydrazine, p-toluenesulfonyl hydrazide (TSH), 4,4'-oxybis(benzenesulfonyl hydrazide) (OBSH), diphenylsulfone-3,3'-disulfonyl hydrazide, benzene-1,3-disulphohydrazide, p-toluenesulfonyl semicarbazide, 4,4'-oxybis (benzenesulfonyl semicarbazide), trihydrazinotriazine (THT), 5-phenyltetrazole, etc. The inorganic foaming agent may include sodium bicarbonate, potassium bicarbonate, sodium carbonate, ammonium bicarbonate, ammonium carbonate, ammonium nitrite, sodium borohydride, and metal powders, etc.

Methods for Manufacturing a Foam

The method for manufacturing a foam according to the present invention is to form a non-foam first, which is made from the polymer composition, and then to form the foam by physically foaming the non-foam. The preferred non-foam is a granule obtained by kneading and extruding or injecting a polymer composition, which may be called as a compound. The shape of the non-foam is not particularly limited, which may be a round shape, a sheet/film shape, a strand like, or crumb like. One another preferred non-foam is a molded non-foam made by extruding or injecting a plurality of granules through a mold. The molded non-foam could be such as a sheet or one in other suitable shape. The physical foaming is preferred in a way of impregnating the non-foam (i.e. the granule or the molded non-foam) in a supercritical fluid for a period of time and then performing a pressure-releasing operation. The impregnation lime depends on the size and thickness of the non-foam, preferred within 1 to 120 minutes, more preferred within 10-90 minutes and even more preferred within 15 to 60 minutes. The supercritical fluid may be carbon dioxide or nitrogen, wherein carbon dioxide is preferred.

The method for manufacturing a foam of the present invention can be a batch way or a continuous way, wherein the batch way means that the step of kneading and extruding (or injection) and the step of foaming are performed separately on different machines while the continuous way means that the step of kneading and extruding (or injection) and the step of foaming are performed on the same machine. Specifically, the batch way may be such that the aforementioned polymer composition is hot-melt mixed in a suitable kneader (for example, a twin-screw extruder or other suitable machine), and then formed into pellets (i.e. granules) by a granulator. A plurality of the granules may be selectively extruded or injected through a mold to form a molded non-foam. The granule or the molded non-foam is then sent to a supercritical fluid impregnation machine for foaming. The continuous way may be such that the above-mentioned polymer composition is filled into an extrusion foaming machine and directly formed into a foam by kneading, molding and foaming the polymer composition in the extrusion foaming machine, wherein supercritical fluid is injected into the extrusion foaming machine. Preferably, in the polymer composition the vinyl aromatic based copolymer is hydrogenated linear triblock copolymer like styrene-ethylene-butylene-styrene block copolymer (SEBS), wherein the weight average molecular weight of the vinyl aromatic based copolymer ranges from 100,000 to 500,000, the vinyl aromatic monomer content of the vinyl aromatic based copolymer is 20 wt % to 35 wt %, the vinyl structure content of the conjugated diene monomer in the vinyl aromatic based copolymer is 30 wt % to 45 wt %. A crystalline polymer, a compatibilizer, a crosslinking agent or a chemical foaming agent may be optionally added. In the condition that the crosslinking agent or the chemical foaming agent is added, the hot melt mixing should be performed under a temperature where the crosslinking agent or the chemical foaming agent does not decompose. The sequence of addition of each component at the time of mixing is not specifically limited.

The following Examples describe the methods, features, and advantages of the present invention in detail. However, it is not intended to limit the scope of the present invention. The scope of the present invention should be determined by the appended claims.

The properties of the vinyl aromatic based copolymer used in some examples or comparative examples of the present invention are as follows. SEBS Polymer A (Taipol-6159): structured as hydrogenated linear triblock, styrene content 30 wt %, vinyl structure content 38% and the weight average molecular weight 450,000. SEBS Polymer B (Taipol-6151): structured as hydrogenated linear triblock, styrene content 30 wt %, vinyl structure content 38% and the weight average molecular weight 250,000. SEBS Polymer C (Taipol-6154): structured as hydrogenated linear triblock, styrene content 30 wt %, vinyl structure content 38% and the weight average molecular weight 170,000. SEBS Polymer D (Taipol-6150): structured as hydrogenated linear triblock, styrene content 30 wt %, vinyl structure content 38% and the weight average molecular weight 110,000.

The First Embodiment

In the polymer composition of the first embodiment, the vinyl aromatic based copolymer is a hydrogenated linear triblock copolymer, the weight average molecular weight of the vinyl aromatic based copolymer ranges from 200,000 to 500,000, the vinyl aromatic monomer content of the vinyl aromatic based copolymer is 20 wt % to 35 wt %, the vinyl structure content of the conjugated diene monomer in the vinyl aromatic based copolymer is 30 wt % to 45 wt %. The amount of the processing aid in the total weight of the polymer composition is equal to or more than 5 wt % and less than 30 wt %, and the processing aid comprises a process oil.

The present invention provides a foam made from the vinyl aromatic based copolymer in accordance with the first embodiment, the foam comprising a plurality of cells, wherein by SEM (scanning electron microscope) observation the foam is characteristic in that: the cell size distribution of the cell is ranged from 40 μm to 135 μm; the aspect ratio of the cell is ranged from 1 to 2.5; the number of the cells in 100 μm×100 μm cross section of the foam is one to ten; and the density of the foam is equal to or less than 0.2 g/cm$^3$. The falling ball rebound value of the foam is equal to or more than 35% and less than 40%. The foam is obtained by impregnating a non-foam in a supercritical fluid for a period of time and then performing a pressure-releasing operation and the non-foam is made from the polymer composition. The impregnation time depends on the size and thickness of the non-foam, preferred within 1 to 120 minutes, more preferred within 10-90 minutes and even more preferred within 15 to 60 minutes.

In Example 1b, 17 wt % of paraffin oil (SK-150N) was added into 83 wt % of SEBS Polymer B. The remaining steps are the same as described in Example 1a.

Table 1 shows the analysis results of Examples 1a and 1b.

Figure 1A:
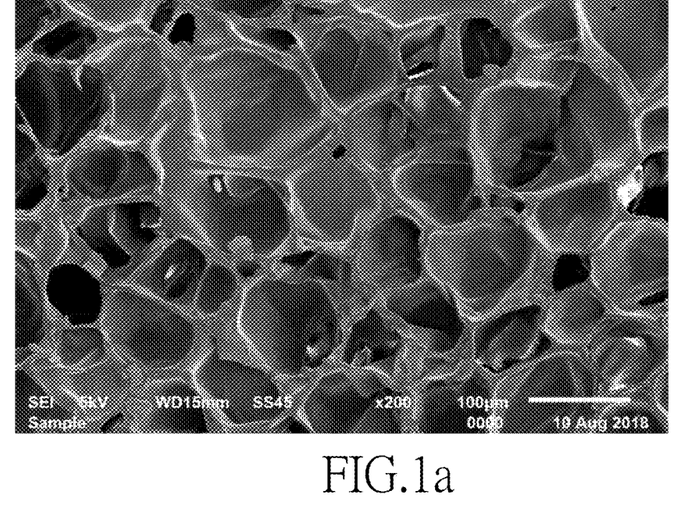
FIGS. 1a and 1b are SEM photographs of cross-sections of foams obtained in the first embodiment of the present invention.
Figure 1B:
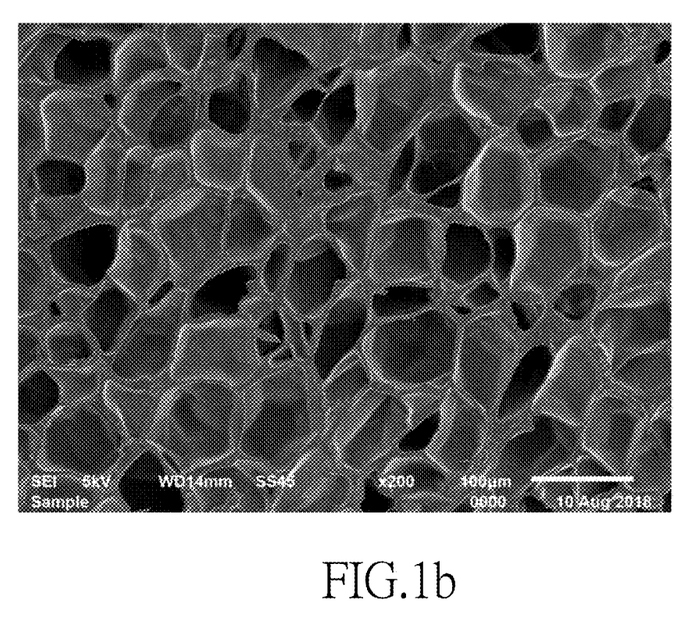

| Ex. | SEBS-B (wt %) | Paraffin oil (wt %) | Density (g/cm$^3$) | Cell size distribution (μm) | Aspect ratio of the cell | Number of cells per unit area | Falling ball rebound value (%) | SEM |
|---|---|---|---|---|---|---|---|---|
| 1a | 95 | 5 | 0.18 | 50-135 | 1-2 | 1-3 | 35 | FIG. 1a |
| 1b | 83 | 17 | 0.173 | 40-95 | 1-2.2 | 2-5 | 35 | FIG. 1b |

Example 1a 5 wt % of paraffin oil (SK-150N) was added into 95wt % of SEBS Polymer B. The mixture was kneaded and granulated at 160 to 230° C. by a twin-screw extruder to obtain pellets (size: maximum diameter of about 5 mm), and it was called granules. The granules were placed in a carbon dioxide supercritical fluid foaming device to impregnate for 30 mins, the temperature was set to 80±10° C., and the pressure was 100 to 200 kg/cm$^2$. After the impregnation, a rapid pressure-releasing operation is performed and then the bead-like foam was taken out. After the bead-like foam was allowed to stand for one day, the density was measured and a SEM photograph of the bead-like foam in cross section (FIG. 1a) was taken to analyze the cell properties: cell size distribution, aspect ratio of cell, and number of the cells per unit area. In addition, a number of granules were taken to form a sheet material (size: 50*100 mm) at a temperature of 160 to 210° C. using an injection machine. The sheet material was placed in a carbon dioxide supercritical fluid foaming device to impregnate for 30 mins, the temperature was set to 80±10° C., and the pressure was 100 to 200 kg/cm$^2$. After the impregnation, a rapid pressure-releasing operation was performed and then a foamed sheet was taken out. After the foamed sheet was allowed to stand for one day, the falling ball rebound value was measured.

The Second Embodiment

In the polymer composition of the second embodiment, the vinyl aromatic based copolymer is a hydrogenated linear triblock copolymer, the weight average molecular weight of the vinyl aromatic based copolymer ranges from 200,000 to 500,000, the vinyl aromatic monomer content of the vinyl aromatic based copolymer is 20 wt % to 35 wt %, the vinyl structure content of the conjugated diene monomer in the vinyl aromatic based copolymer is 30 wt % to 45 wt %. The amount of the processing aid in the total weight of the polymer composition is equal to or more than 30 wt % and equal to or less than 40 wt %, and the processing aid comprises a process oil.

The present invention provides a foam made from vinyl aromatic based copolymer in accordance with the second embodiment, the foam comprising a plurality of cells, wherein by SEM (scanning electron microscope) observation the foam is characteristic in that: the cell size distribution of the cell is ranged from 10 μm to 30 μm; the aspect ratio of cell is ranged from 1 to 1.5; the number of cells in 100 μm×100 μm cross section of the foam is twenty to thirty; and the density of the foam is from 0.2 to 0.45 g/cm$^3$. Preferably, the falling ball rebound value of the foam is equal to or more than 40% and less than 50%. The foam is obtained by impregnating a non-foam in a supercritical fluid for a period of time and then performing a pressure-releasing operation and the non-foam is made from the polymer composition. The impregnation time depends on the size and thickness of the non-foam, preferred within 1 to 120 minutes, more preferred within 10-90 minutes and even more preferred within 15 to 60 minutes.

In Example 2, 33 wt % of paraffin oil (SK-150N) was added into 67 wt % of SEBS Polymer B. The remaining steps are the same as described in Example 1a.

Table 2 shows the analysis results of Example 2.

Figure 2:
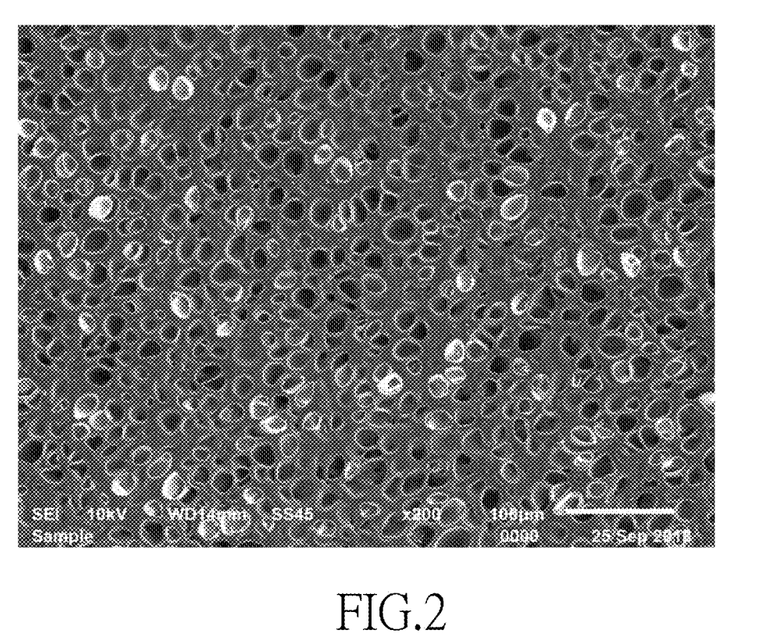
FIG. 2 is SEM photograph of a cross-section of a foam obtained in the second embodiment of the present invention.

| Ex. | SEBS-B (wt %) | Paraffin oil (wt %) | Density (g/cm$^3$) | Cell size distribution (μm) | Aspect ratio of the cell | Number of cells per unit area | Falling ball rebound value (%) | SEM |
|---|---|---|---|---|---|---|---|---|
| 2 | 67 | 33 | 0.397 | 10-30 | 1-1.5 | 20-30 | 45 | FIG. 2 |

The Third Embodiment

In the polymer composition of the third embodiment, the vinyl aromatic based copolymer is a hydrogenated linear triblock copolymer, the weight average molecular weight of the vinyl aromatic based copolymer ranges from 100,000 to 500,000, the vinyl aromatic monomer content of the vinyl aromatic based copolymer is 20 wt % to 35 wt %, the vinyl structure content of the conjugated diene monomer in the vinyl aromatic based copolymer is 30 wt % to 45 wt %. The amount of the processing aid in the total weight of the polymer composition is more than 40 wt % and equal to or less than 75 wt %, and the processing aid comprises a process oil.

The present invention provides a foam made from vinyl aromatic based copolymer in accordance with the third embodiment, the foam comprising a plurality of cells, wherein by SEM (scanning electron microscope) observation the foam is characteristic in that: the cell size distribution of the cell is ranged from 10 μm to 50 μm; the aspect ratio of the cell is ranged from 1 to 1.5; the number of the cells in 100 μm×100 μm cross section of the foam is five to thirty; and the density of the foam is from 0.3 to 0.6 g/cm$^3$. Preferably, the falling ball rebound value of the foam is more than 40%. The foam is obtained by impregnating a non-foam in a supercritical fluid for a period of time and then performing a pressure-releasing operation and the non-foam is made from the polymer composition. The impregnation time depends on the size and thickness of the non-foam, preferred within 1 to 120 minutes, more preferred within 10-90 minutes and even more preferred within 15 to 60 minutes.

In Examples 3a, 3b and 3c, the polymer compositions are listed as follows: Example 3a: 67 wt % of paraffin oil (SK-150N) was added into 33 wt % of SEBS Polymer B; Example 3b: 67 wt % of paraffin oil (SK-150N) was added into 33 wt % of SEBS Polymer A; and Example 3c: 67 wt % of paraffin oil (SK-150N) was added into 33 wt % of SEBS Polymer C. In Example 3a, 3b and 3c, the remaining steps are the same as described in Example 1a.

In the polymer composition of Example 3d, 67 wt % of paraffin oil (SK-150N) was added into a total of 33 wt % of SEBS polymer C and SEBS polymer D (mixing ratio 1:1). The remaining steps are the same as described in Example 1a, except that Example 3d did not perform the step of manufacturing a foamed sheet as described in Example 1a.

Example 3e: 67 wt % of paraffin oil (SK-150N) was added into a total of 33 wt % of SEBS polymer C and SEBS polymer D (mixing ratio 1:1). The mixture was kneaded and granulated at 160 to 230° C. by a twin-screw extruder to obtain pellets (size: maximum diameter of about 5 mm), and it was called granules. A number of granules were taken to form a sheet material (size: 50*100 mm) at a temperature of 160 to 210° C. using an injection machine. The sheet material was placed in a carbon dioxide supercritical fluid foaming device to impregnate for 30 mins, the temperature was set to 80±10° C., and the pressure was 100 to 200 kg/cm$^2$. After the impregnation, a rapid pressure-releasing operation was performed and then a foamed sheet was taken out. After the foamed sheet was allowed to stand for one day, the density and the falling ball rebound value were measured and a SEM photograph of the foamed sheet in cross section (FIG. 3e) was taken to analyze the cell properties: cell size distribution, aspect ratio of the cell, and the number of the cells per unit area. Note that the bead-like foam is not made in Example 3e.

Example 3f (Bonding the Bead-Like Foams to Form a Sheet)

67 wt % of paraffin oil (SK-150N) was added into a total of 33 wt % of SEBS polymer C and SEBS polymer D (mixing ratio 1:1). The mixture was kneaded and granulated at 160 to 230° C. by a twin-screw extruder to obtain pellets (size: maximum diameter of about 5 mm), and it was called granules. The granule was placed in a carbon dioxide supercritical fluid foaming device to impregnate for 30 mins, the temperature was set to 80±10° C., and the pressure was 100 to 200 kg/cm$^2$. After the impregnation, a rapid pressure-releasing operation was performed and then the bead-like foam was taken out. A number of the bead-like foams were bonded into a sheet by microwave, called as a sheet of foam beads bonded. After the sheet of foam beads bonded was allowed to stand for one day, the density and the falling ball rebound value were measured and a SEM photograph of the sheet of foam beads bonded in cross section (FIG. 3f) was taken to analyze the cell properties: cell size distribution, aspect ratio of the cell, and the number of the cells per unit area. Example 3f differs from Example 3d in that the Example 3f further bonded the bead-like foams to get a sheet of foam beads bonded by microwave.

In Example 3g, 50 wt % of paraffin oil (SK-150N) was added into 50 wt % of SEBS Polymer B. The remaining steps are the same as described in Example 1a. Note that Example 3g did not take photograph of SEM in cross-section.

Table 3 shows the analysis results of Example 3a to 3g.

Figure 3A:
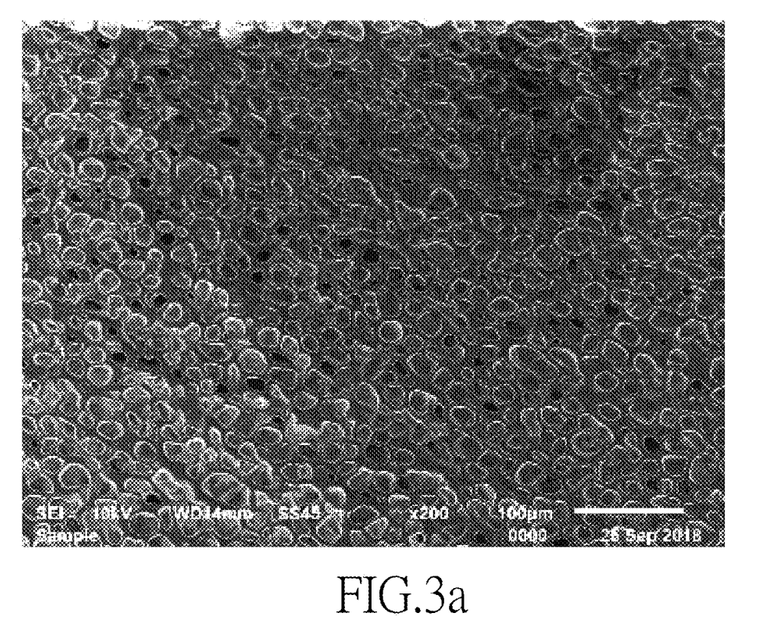
FIGS. 3a to 3f are SEM photographs of cross-sections of foams obtained in the third embodiment of the present invention.
Figure 3B:
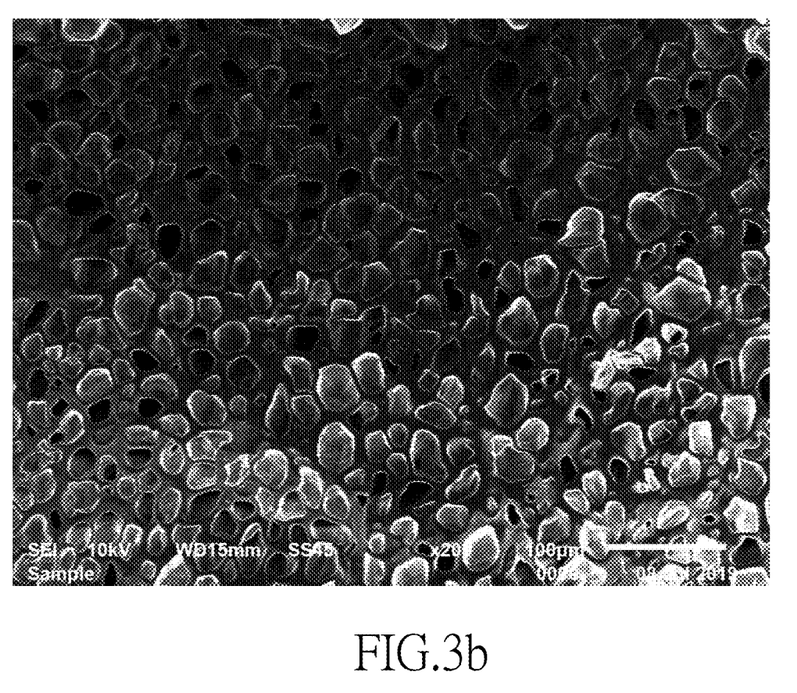
Figure 3C:
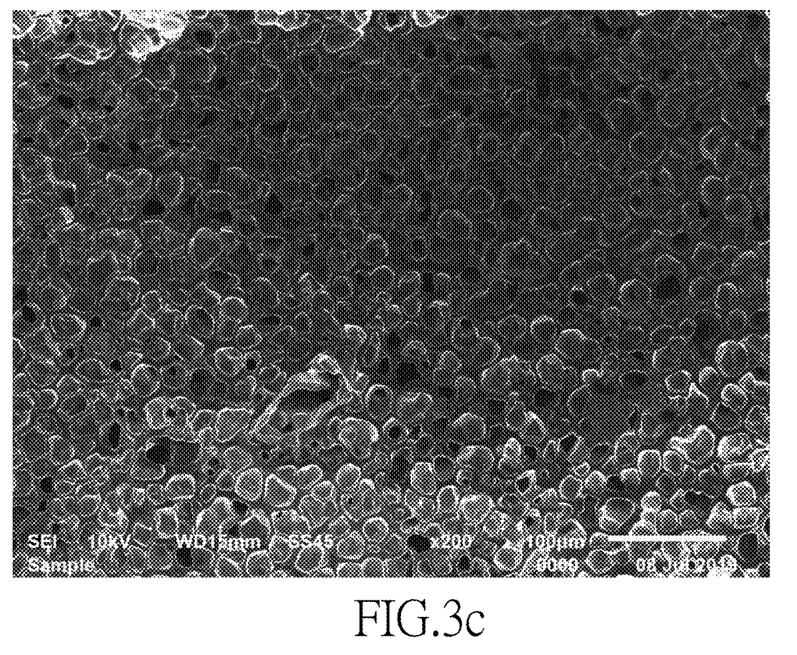
Figure 3D:
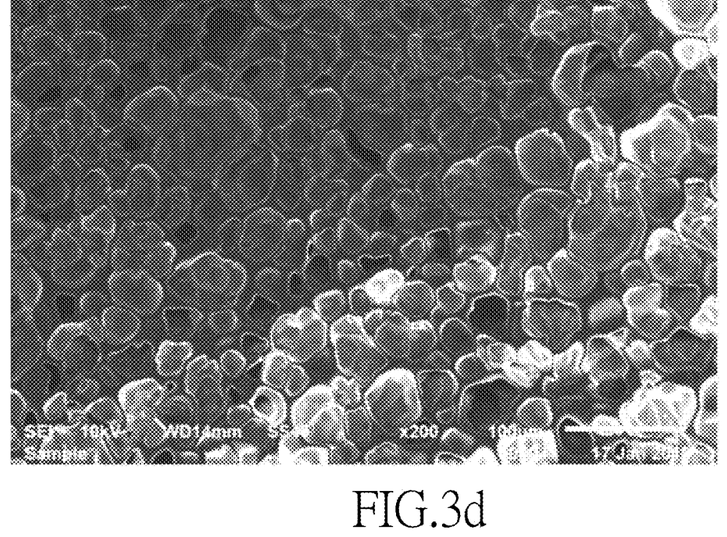
Figure 3E:
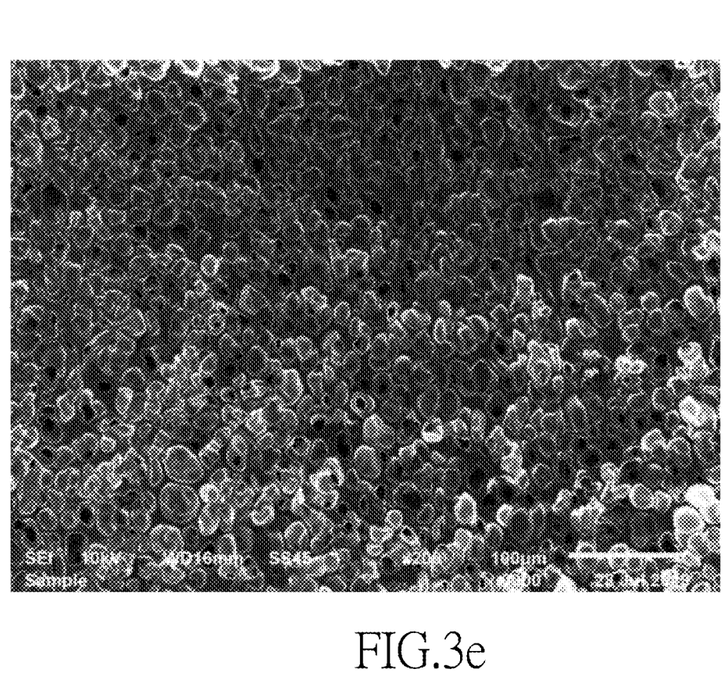
Figure 3F:
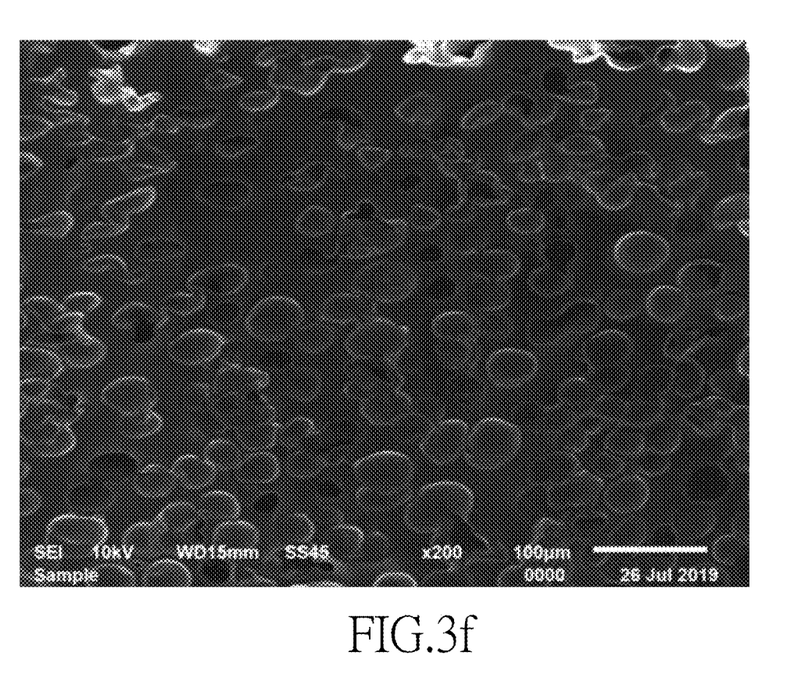

| Ex. | Vinyl aromatic based copolymer (wt %) | Paraffin oil (wt %) | Density (g/cm$^3$) | Cell size distribution (μm) | Aspect ratio of the cell | Number of cells per unit area | Falling ball rebound value (%) | SEM |
|---|---|---|---|---|---|---|---|---|
| 3a | SEBS-B 33 | 67 | 0.438 | 10-30 | 1-1.5 | 20-30 | 50 | FIG. 3a |
| 3b | SEBS-A 33 | 67 | 0.36 | 10-50 | 1-1.5 | 10-20 | 50 | FIG. 3b |
| 3c | SEBS-C 33 | 67 | 0.4 | 10-30 | 1-1.2 | 20-30 | 48 | FIG. 3c |
| 3d | SEBS-C&D 33 | 67 | 0.45 | 20-50 | 1-1.2 | 10-15 | X | FIG. 3d |
| 3e | SEBS-C&D 33 | 67 | 0.35 | 10-35 | 1-1.5 | 20-30 | 51 | FIG. 3e |
| 3f | SEBS-C&D 33 | 67 | 0.6 | 25-50 | 1-1.2 | 5-10 | 53 | FIG. 3f |
| 3g | SEBS-B 50 | 50 | 0.44 | X | X | X | 44 | X |

The Fourth Embodiment

In the polymer composition of the fourth embodiment, the vinyl aromatic based copolymer is a hydrogenated linear triblock copolymer, the weight average molecular weight of the vinyl aromatic based copolymer ranges from 200,000 to 500,000, the vinyl aromatic monomer content of the vinyl aromatic based copolymer is 20 wt % to 35 wt %, the vinyl structure content of the conjugated diene monomer in the vinyl aromatic based copolymer is 30 wt % to 45 wt %. The amount of the processing aid in the total weight of the polymer composition is equal to or more than 25 wt % and less than 60 wt %, and the processing aid comprises a process oil. The polymer composition further comprises a crystalline polymer, and a compatibilizer which is added optionally. The content of the crystalline polymer in the total weight of the polymer composition is equal to or more than 1 wt % and less than 40 wt % and the content of the compatibilizer in the total weight of the polymer composition is equal to or less than 25 wt %. The crystalline polymer is preferred polyamide or thermoplastic polyester elastomer. The compatibilizer is preferred maleic anhydride grafted styrene-ethylene-butylene-styrene block copolymer(MA-SEBS). In example of polyamide, the content of the polyamide in the total weight of the polymer composition is equal to or more than 10 wt % and less than 40 wt % and the content of MA-SEBS in the total weight of the polymer composition is equal to or more than 5 wt % and less than 25 wt %. In example of thermoplastic polyester elastomer, the content of the thermoplastic polyester elastomer in the total weight of the polymer composition is equal to or more than 1 wt % and less than 10 wt % and the content of MA-SEBS in the total weight of the polymer composition is equal to or more than 5 wt % and less than 15 wt %.

The present invention provides a foam made from vinyl aromatic based copolymer in accordance with the fourth embodiment, the foam comprising a plurality of cells; and the density of the foam is 0.3 to 0.6 g/cm$^3$. Preferably, the falling ball rebound value of the foam is equal to or more than 40%. The foam is obtained by impregnating a non-foam in a supercritical fluid for a period of time and then performing a pressure-releasing operation and the non-foam is made from the polymer composition.

Table 4 shows the properties of foams made from the polymer compositions in accordance with Examples 4a to 4e. Regarding Examples 4a to 4e, in addition to the polymer compositions, the remaining steps are the same as described in Example 1a. In Table 4, Paraffin oil is Idemitsu PW90; PA6 is polyamide (ZISAMIDE TP4208); TPPE is thermoplastic polyester elastomer (DuPont Hytrel 38D); MA-SEBS is maleic anhydride grafted styrene-ethylene-butylene-styrene block copolymer(Taipol-7131).

Table 4 shows the analysis results of Example 4a and 4e.

| Ex. | SEBS-B (wt %) | Paraffin oil (wt %) | Crystalline polymer (wt %) | MA-SEBS (wt %) | Density (g/cm$^3$) | Falling ball rebound value (%) |
|---|---|---|---|---|---|---|
| 4a | 35 | 35 | PA 6 20 | 10 | 0.41 | 47 |
| 4b | 30 | 30 | PA 6 20 | 20 | 0.36 | 48 |
| 4c | 40 | 40 | PA 6 10 | 10 | 0.482 | 47 |
| 4d | 30 | 30 | PA 6 30 | 10 | 0.512 | 44 |
| 4e | 42.5 | 42.5 | TPEE 5 | 10 | 0.432 | 55 |

Comparative Examples

Comparative Example 1 (without oil): 100 wt % of SEBS polymer B was prepared without adding oil. The polymer was kneaded and granulated at 160 to 230° C. by a twin-screw extruder. The molding process cannot be carried out. It failed to get the granules. Injection molding cannot be performed either.

Comparative Example 2 (Excess oil content): 80 wt % of paraffin oil (SK-150N) was added into 20 wt % of SEBS polymer B. The mixture was kneaded and granulated at 160 to 230° C. by a twin-screw extruder. It resulted too much oil. SEBS polymer B can not completely absorb the oil where the oil exceeded the oil absorption limit of SEBS polymer B.

Comparative Example 3 (containing HDPE): 53.3 wt % of paraffin oil (SK-150N) and 20 wt % of HDPE (TAISOX 8010) were added into 26.7 wt % of SEBS polymer B. The remaining steps are the same as described in Example 1a. The obtained foam has a density 0.752 g/cm$^3$ (too high) and the falling ball rebound value is 31% (too low).

Comparative Example 4 (containing PP): 53.3 wt % of paraffin oil (SK-150N) and 20 wt % of PP (Globalene PP PC-366-3) were added into 26.7 wt % of SEBS polymer B. The remaining steps are the same as described in Example 1a. The obtained foam has a density 0.725 g/cm$^3$ (too high) and the falling ball rebound value is 31 % (too low).

Comparative Example 5 (containing PP): 33.3 wt % of paraffin oil (SK-150N) and 50 wt % of PP (Globalene PP PC-366-3) were added into 16.7 wt % of SEBS polymer B. The remaining steps are the same as described in Example 1a. The obtained foam has a density 0.798 g/cm$^3$ (too high) and the falling ball rebound value is 23% (too low).

The present invention further comprises forming the above-mentioned foam into a part. The part can be sports-related accessories, shoe materials, healthcare materials, automotive or motorcycle components, or daily necessities.

Although the present invention has been disclosed in the above preferred embodiments, it is not intended to limit the invention, and it is possible for those skilled in the art to make alterations and modifications without departing from the spirit and scope of the invention. The scope of the invention is defined by the appended claims.

What is claimed is:

1. A polymer composition for manufacturing a foam, the polymer composition comprising a vinyl aromatic based copolymer and a processing aid, wherein the amount of the processing aid in the total weight of the polymer composition is equal to or more than 5 wt % and less than 30 wt %, and the processing aid comprises a process oil, wherein the process oil is aromatic oil, naphthenic oil, or paraffin oil; and the polymer composition does not comprise ethylene-vinyl acetate copolymer, ethylene-butyl acrylate copolymer, homopolymer of polyethylene, homopolymer and copolymer of polypropylene, homopolymer of polybutene, and olefin-based ionic polymer, wherein the vinyl aromatic based copolymer is a hydrogenated copolymer, the weight average molecular weight of the vinyl aromatic based copolymer ranges from 200,000 to 500,000, and wherein monomers of the vinyl aromatic based copolymer include a vinyl aromatic monomer and a conjugated diene monomer, wherein a vinyl aromatic monomer content of the vinyl aromatic based copolymer is 20 wt % to 35 wt %, and a vinyl structure content of the conjugated diene monomer in the vinyl aromatic based copolymer is 30 wt % to 45 wt %.

2. The polymer composition of claim 1, wherein the polymer composition only comprises the vinyl aromatic based copolymer and the processing aid.

3. The polymer composition of claim 1, wherein the polymer composition is used for foaming with a supercritical fluid.

4. The polymer composition of claim 1, further comprising a crystalline polymer.

5. The polymer composition of claim 4, further comprising a compatibilizer.

6. The polymer composition of claim 4, wherein the content of the crystalline polymer in the total weight of the polymer composition is equal to or more than 1 wt % and less than 40 wt %.

7. The polymer composition of claim 4, wherein the crystalline polymer is polyamide and the content of the polyamide in the total weight of the polymer composition is equal to or more than 10 wt % and less than 40 wt %.

8. The polymer composition of claim 4, wherein the crystalline polymer is thermoplastic polyester elastomer and the content of the thermoplastic polyester elastomer in the total weight of the polymer composition is equal to or more than 1 wt % and less than 10 wt %.

9. A method for manufacturing a foam, comprising forming a non-foam using the polymer composition of claim 1, and forming the foam by physically foaming the non-foam.

10. The method of claim 9, further comprising forming the non-foam by a batch way using a kneader, and forming the foam by sending the non-foam to a supercritical fluid impregnation machine.

11. A method for manufacturing a foam, comprising filling the polymer composition of claim 1 into an extrusion foaming machine and directly forming the foam by kneading, molding and foaming the polymer composition using a continuous way in the extrusion foaming machine, wherein supercritical fluid is injected into the extrusion foaming machine.

12. A foam made from the polymer composition of claim 1.

13. A foam made from the polymer composition of claim 1, the foam comprising a plurality of cells, wherein by SEM (scanning electron microscope) observation the foam is characteristic in that:

a cell size distribution is ranged from 40 μm to 135 μm;
a aspect ratio of the cell is ranged from 1 to 2.5;
a number of the cells in 100 μm×100 μm cross section of the foam is one to ten; and
the density of the foam is equal to or less than 0.2 $g/m^3$.

14. The foam of claim 13, wherein a falling ball rebound value of the foam is equal to or more than 35% and less than 40%.

15. A part made of the foam of claim 12.

16. The part of claim 15, wherein the part is formed by bonding the foam.

17. The part of claim 15, wherein the part is used for sports-related accessories, shoe materials, healthcare materials, automotive or motorcycle components, or daily necessities.

18. A polymer composition for manufacturing a foam, the polymer composition consisting of a vinyl aromatic based copolymer and a processing aid, wherein the processing aid comprises a process oil that is aromatic oil, naphthenic oil, or paraffin oil, and the amount of the processing aid in the total weight of the polymer composition is equal to or more than 5 wt % and less than 30 wt %, and wherein the vinyl aromatic based copolymer is a hydrogenated copolymer, the weight average molecular weight of the vinyl aromatic based copolymer ranges from 200,000 to 500,000, and wherein monomers of the vinyl aromatic based copolymer include a vinyl aromatic monomer and a conjugated diene monomer, wherein a vinyl aromatic monomer content of the vinyl aromatic based copolymer is 20 wt % to 35 wt %, and a vinyl structure content of the conjugated diene monomer in the vinyl aromatic based copolymer is 30 wt % to 45 wt %.

* * * * *